United States Patent
Le-Khac et al.

(10) Patent No.: US 6,815,513 B2
(45) Date of Patent: Nov. 9, 2004

(54) PROCESS FOR PREPARING COMB-BRANCHED POLYMERS

(75) Inventors: Bi Le-Khac, West Chester, PA (US); Wei Wang, Boothwyn, PA (US); Edward T. Shawl, Wallingford, PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 297 days.

(21) Appl. No.: 09/760,931

(22) Filed: Jan. 16, 2001

(65) Prior Publication Data

US 2001/0001797 A1 May 24, 2001

Related U.S. Application Data

(63) Continuation of application No. 09/358,009, filed on Jul. 21, 1999, now Pat. No. 6,214,958.

(51) Int. Cl.$^7$ .................. C08F 4/00; C08F 120/06
(52) U.S. Cl. .............. 526/89; 526/78; 526/318.4; 526/317.1; 526/319; 526/240; 524/5
(58) Field of Search ................. 526/78, 89, 319, 526/318.1, 240, 317.1, 318.3, 241, 318.4; 524/5; 525/309, 310, 301, 303

(56) References Cited

U.S. PATENT DOCUMENTS

| | | | | |
|---|---|---|---|---|
| 4,466,904 A | * | 8/1984 | Watson et al. | 252/402 |
| 4,814,014 A | | 3/1989 | Arfaei | 106/90 |
| 5,605,991 A | * | 2/1997 | Chamberlain et al. | 260/665 R |
| 5,773,521 A | * | 6/1998 | Hoxmeier et al. | 525/271 |
| 5,789,488 A | * | 8/1998 | Bair et al. | 525/328.4 |
| 5,834,576 A | | 11/1998 | Nagano et al. | 526/318.3 |
| 5,854,386 A | * | 12/1998 | Shen et al. | 528/403 |
| 6,034,208 A | * | 3/2000 | McDaniel et al. | 528/403 |
| 6,214,958 B1 | * | 4/2001 | Le-Khac et al. | 526/318.3 |

* cited by examiner

Primary Examiner—Tatyana Zalukaeva
(74) Attorney, Agent, or Firm—Shao-Hua Guo

(57) ABSTRACT

A continuous process for making a comb-branched copolymer of an acrylic monomer and a polyether macromonomer is disclosed. The process is performed by continuously feeding a reaction zone with a monomer stream that contains an acrylic acid and a polyether macromonomer, and an initiator stream. The comb-branched copolymer made thereby performs better as water reducing agent in cement compared to that made by a batch process.

2 Claims, No Drawings

PROCESS FOR PREPARING COMB-BRANCHED POLYMERS

This application is a continuation of Appl. Ser. No. 09/358,009, filed Jul. 21, 1999, now U.S. Pat. No. 6,214,958.

FIELD OF THE INVENTION

The invention relates to a method for preparing comb-branched polymers. More particularly, the invention relates to a continuous polymerization process for making a copolymer of a polyether macromonomer and an acrylic monomer. The copolymers are valuable water reducing agents for cement.

BACKGROUND OF THE INVENTION

Water reducing agents reduce the amount of water needed in cement admixtures, while maintaining good processing ability and consistency. Lignin sulfonates and naphthalene sulfonate-formaldehyde condensates have long been used as water reducing agents. These conventional water reducing agents are readily available and relatively inexpensive. However, they are used in high doses.

In contrast, newly developed polymeric water reducing agents offer high performance but are more expensive to make. U.S. Pat. No 4,814,014, for example, teaches to graft ethylenically unsaturated monomers onto a polyether. The graft copolymer is used at a low dosage. Unfortunately, it is contaminated with a large portion of non-grafted polyether and ethylenic homopolymer. Because these non-grafted polymers do not function as water reducing agents, they reduce the effectiveness of the product.

Comb-branched copolymers of acrylic acid and polyether macromonomers have been used as high performance water reducing agents (see U.S. Pat. No. 5,834,576). The comb-branched copolymers have more uniform structures compared to the graft polymers of U.S. Pat. No. 4,814,014. Consequently, they have higher water reducing ability. An added advantage of these copolymers is the improved ability to maintain "slump." Slump retention is the workable time after the cement admixture is mixed. Commonly used polyether macromonomers include acrylates, methacrylates, and allyl ethers of polyether.

Methods for preparing comb-branched copolymers of carboxylic monomers and polyether macromonomers are known and relatively simple. In general, free radically polymerizing a polyether macromonomer with a carboxylic monomer forms a comb-branched copolymer. While the related literature briefly mentions batch, semi-batch, and continuous processes (see U.S. Pat. No. 5,834,576, and copending application Ser. No. 09/074,673), no one has suggested that a continuous process would offer comb-branched copolymers that perform better in cement compositions. Specific teachings about how to conduct a continuous process for making comb-branched copolymers are not available. U.S. Pat. No. 5,834,576, for example, only teaches details of a batch process.

SUMMARY OF THE INVENTION

The invention is a continuous process for making a comb-branched copolymer of an acrylic monomer and a polyether macromonomer. The process comprises: (a) forming a monomer stream, an initiator stream, and an optional chain transfer agent stream; (b) polymerizing the streams in a reaction zone at a temperature within the range of about −20° C. to about 150° C.; and (c) withdrawing a polymer stream from the reaction zone.

The invention also includes a multiple-zone process that comprises: (a) forming a monomer stream, an initiator stream, and an optional chain transfer agent stream; (b) polymerizing the streams in a first reaction zone at a temperature within the range of about −20° C. to about 150° C.; (c) transferring a first polymer stream from the first reaction zone to a second reaction zone wherein the polymerization continues; and (d) withdrawing a second polymer stream from the second reaction zone. The multiple-zone process enhances monomer conversion and process efficiency.

We surprisingly found that the comb-branched copolymers made by the process of the invention perform significantly better as water reducing agent in cement compared with polymers made by a batch process. They offer higher slump and flow.

DETAILED DESCRIPTION OF THE INVENTION

The continuous process of the invention uses streams of a monomer, an initiator, and, optionally, a chain transfer agent. The monomer stream contains an acrylic monomer and a polyether macromonomer. Suitable acrylic monomers derive from acrylic acid and methacrylic acid. Preferred acrylic monomers include acrylic acid, methacrylic acid, their ammonium and alkali metal salts, their $C_1$ to $C_{10}$ alkyl and $C_6$ to $C_{12}$ aryl esters, and their amides. Acrylic acid, methacrylic acid, ammonium acrylate, ammonium methacrylate, sodium acrylate, sodium methacrylate, potassium acrylate, and potassium methacrylate are preferred. Most preferred are acrylic acid and methacrylic acid.

Suitable polyether macromonomers have a polyether chain and a single carbon-carbon double bond, which can be located either at the end of or inside the polyether chain. Examples include polyether monoacrylates, polyether monomethacrylates, polyether monoallyl ethers, polyether monomaleates, and polyether monofumarates. The polyether of the macromonomer is an alkylene oxide polymer having a number average molecular weight within the range of about 500 to about 10,000. Suitable alkylene oxides include ethylene oxide, propylene oxide, butylene oxide, and the like, and mixtures thereof. The polyether macromonomers preferably have hydroxyl functionality from 0 to 5. They can be either linear or branched polymers, homopolymers or copolymers, random or block copolymers, diblock or multiple-block copolymers.

Examples of polyether macromonomers are poly(propylene glycol) acrylates or methacrylates, poly(ethylene glycol) acrylates or methacrylates, poly(ethylene glycol) methyl ether acrylates or methacrylates, acrylates or methacrylates of an oxyethylene and oxypropylene block or random copolymer, poly(propylene glycol) allyl ether, poly(ethylene glycol) allyl ether, poly(propylene glycol) monomaleate, and the like, and mixtures thereof. Preferred polyether macromonomers are poly(propylene glycol) acrylates or methacrylates, poly(ethylene glycol) acrylates or methacrylates, acrylates or methacrylates of an oxyethylene and oxypropylene block and random copolymer. More preferred are acrylates or methacrylates of an oxyethylene and oxypropylene block or random copolymer.

The ratio of acrylic monomer to polyether macromonomer is determined by many factors within the skilled person's discretion, including the required physical properties of the comb-branched copolymer, the selection of the acrylic monomer, and the properties of the polyether macromonomer. The ratio generally is within the range from 1/99 to 99/1 by weight. The preferred range is from 5/95 to 75/25.

Optionally, the monomer stream contains a third monomer. The third monomer is preferably selected from vinyl aromatics, vinyl halides, vinyl ethers, vinyl esters, vinyl pyrrolidinones, conjugated dienes, unsaturated sulfonic acids, unsaturated phosphonic acids, and the like and mixtures thereof. The amount of third monomer used depends on the required physical properties of the comb-branched copolymer product, but is preferably less that 50% by weight of the total amount of monomers.

Optionally, the monomer stream also includes a solvent. The solvent is used to dissolve the monomer, to assist heat transfer of the polymerization, or to reduce the viscosity of the final product. The solvent is preferably selected from water, alcohols, ethers, esters, ketones, aliphatic hydrocarbons, aromatic hydrocarbons, halides, and the like, and mixtures thereof. Selections of solvent type and amount are determined by the polymerization conditions including reaction temperature. Water and alcohols, such as methanol, ethanol, and isopropanol, are preferred.

The initiator stream contains a free radical initiator. The initiator is preferably selected from persulfates, hydrogen peroxide, organic peroxides and hydroperoxides, azo compounds, and redox initiators such as hydrogen peroxide plus ferrous ion. Persulfates, such as ammonium and potassium persulfate, are preferred.

Optionally, the initiator stream contains a solvent. The solvent is used to dissolve or dilute the initiator, to control the polymerization rate, or to aid heat or mass transfer of the polymerization. Suitable solvents are described above. Selections of solvent type and amount are determined by the nature of the initiator and the polymerization conditions. Water and alcohols such as methanol, ethanol, and isopropanol are preferred when persulfate is used as initiator.

The monomer and initiator streams optionally include a chain transfer agent. Suitable chain transfer agent includes alkyl amines, alkyl sulfides, alkyl disulfides, carbon tetrahalides, allyl ethers, and mercaptans. Mercaptans, such as butyl mercapan, mercaptoacetic and mercaptopropionic acids, are preferred.

Under some conditions, it is preferred to add the optional chain transfer agent in a separate stream. This is particularly desirable when the chain transfer agent causes decomposition of the initiator or polymerization of the monomer once it is mixed with those components. This is particularly important in a large, commercial scale because these reactions can cause safety problems.

Optionally, the chain transfer agent stream contains a solvent that is used to dissolve or dilute the chain transfer agent. Suitable solvents include water, alcohols, ethers, esters, ketones, aliphatic and aromatic hydrocarbons, halides, and the like, and mixtures thereof. Selections of solvent type and amount are determined by the nature of the chain transfer agent and the polymerization conditions. Water and alcohols, such as methanol, ethanol, and isopropanol, are preferred.

The monomer stream, initiator stream, and optional chain transfer agent stream are polymerized in a reaction zone. The reaction temperature is preferably kept essentially constant during the polymerization. The temperature is determined by a combination of factors including the desired molecular weight of the comb-branched polymer product, the initiator type and concentration, the monomer type and concentration, and the solvent used. The reaction is performed at a temperature within the range of about −20° C. to about 150° C., preferably within the range of about 0° C. to about 100° C. More preferred is the range of about 20° C. to about 90° C. Most preferred is the range of about 40° C. to about 60° C.

The addition rate of each stream depends on the desired concentration of each component, the size and shape of the reaction zone, the reaction temperature, and many other considerations In general, the streams flow into the reaction zone at rates that keep the initiator concentration within the range of about 0.01% to about 1% by weight, and the chain transfer agent concentration within the range of about 0.1% to about 1.5% by weight.

The reaction zone is where the polymerization takes place. It can be in the form of a tank reactor, a tubular reactor, or any other desirably shaped reactor. The reaction zone is preferably equipped with a mixer, a heat transfer device, an inert gas source, and any other suitable equipment.

As the streams are polymerized in the reaction zone, a polymer stream is withdrawn. The flow rate of the polymer stream is such that the reaction zone is mass-balanced, meaning that the amount of material that flows into the reaction zone equals to the amount of material withdrawn from the reaction zone. The polymer stream is then collected.

The invention also includes a multiple zone process. A multiple zone process is similar to the process discussed above except that more than one reaction zone is used. In a multiple zone process, a first polymer stream is withdrawn from a first reaction zone and transferred into a second reaction zone where the polymerization continues. A second polymer stream is withdrawn from the second reaction zone. More than two reaction zones can be used if desirable. The reaction temperature in the second reaction zone can be the same as or different from the first reaction zone. A multiple zone process can enhance monomer conversion and increase efficiency of the process. Usually, in the first polymer stream, the monomer conversion is within the range of about 65% to 85% by weight. The second reaction zone preferably brings the monomer conversion to 90% or greater.

The following examples merely illustrate the invention. Those skilled in the art will recognize many variations that are within the spirit of the invention and scope of the claims.

EXAMPLE 1

Preparation of Comb-branched Copolymer by Continuous Process

An acrylate of oxyethylene/oxypropylene random copolymer having oxyethylene/oxypropylene ratio 50/50 by weight and number average molecular weight Mn of 2,000 (122.5 g, 0.0613 mole), acrylic acid (26.5 g, 0.368 mole), mercaptopropionic acid (1.2 g) and ammonium persulfate (0.70 g) are charged into a one-liter reactor. The reactor is equipped with a stirrer, a temperature controller, a heating coil, a nitrogen purge device, a monomer addition pump, an initiator addition pump, and a sample outlet. The reactor contents are purged with $N_2$ for 20 minutes. Polyether macromonomer (245 g, 0.123 mole), acrylic acid (53 g, 0.736 mole), mercaptopropionic acid (2.6 g) and distilled water (DI water) (145 g) are mixed. The mixture is purged with $N_2$ for 20 minutes and then charged to the monomer pump. Ammonium persulfate (1.4 g) is dissolved in DI water (153 g). The solution is purged with $N_2$ for 20 minutes and then charged into the initiator pump. The reactor contents are heated to 40° C. The monomer mixture and the initiator solution are continuously pumped into the reactor at the rates of 1.0 gram/min and 0.33 gram/min, respectively. The product is continuously withdrawn from the reactor at rate of 1.33 gram/min. After the reaction reaches a steady state (after about 150 grams of polymer is produced), the product is collected for physical property and slump tests. It has a number average molecular weight Mn: 10820, and molecular weight distribution Mw/Mn: 1.36.

The product is tested in a mortar mixture by using the slump test (ASTM method C-143). In a typical test at 15% water cut, water (302 g), cement (760 g), mortar sand (1660 g), and 0.76 gram of the comb-branched polymer (0.10% based on the dry cement) are mixed for 5 minutes, and then the slump test is performed. The cement admixture with 0.10% of the comb-branched copolymer has a slump and a flow of 124 mm and 202 mm, respectively, compared to a slump of 25 mm for the cement admixture without the comb-branched copolymer.

EXAMPLE 2

Preparation of Comb-branched Copolymer by Two-stage Continuous Process

Polyether macromonomer (3894 g, 1.947 mole, as described in Example 1), acrylic acid (561 g, 7.792 mole), mercaptopropionic acid (32 g) and DI water (2200 g) are mixed. The mixture is purged with $N_2$ for 20 minutes and then charged into the monomer pump. Ammonium persulfate (32 g) is dissolved in DI water (2195 g). The solution is purged with $N_2$ for 20 minutes and then charged into the initiator pump. To a first reactor (700 mL) with agitation, 75 grams of the monomer mixture and 25 grams of the initiator solution are added from the addition pumps. The reactor contents are purged with $N_2$ for 20 minutes, and then heated to 40° C. The monomer mixture and the initiator solution are continuously pumped into the reactor at the rates of 6 grams/min and 2 grams/min, respectively. The reaction mixture overflows to a second reactor (500 mL) in which the polymerization continues at 40° C. After the reaction reaches a steady state (after about 1000 grams of polymer is produced), the product is then collected for physical property and slump tests. It has Mn: 11780, and Mw/Mn: 1.50. The slump is tested according to the procedure of Example 1. It has slump: 128, and flow 236 at 0.08% dosage.

COMPARATIVE EXAMPLE 3

Preparation of Comb-branched Copolymer by Semi-batch Process

Polyether macromonomer as described in Example 1 (175 g, 0.0875 mole), acrylic acid (19 g, 0.264 mole), and DI water (207 g) are charged to a one-liter glass reactor equipped with stirrer, temperature controller, heating coil, nitrogen purge device, and addition pump. The reactor contents are purged with $N_2$ for 20 minutes at room temperature and then the reactor is sealed with $N_2$ (3 psi). One gram of ammonium persulfate and 1.8 grams of mercaptopropionic acid are added to the reactor. The reactor contents are heated to 40° C., and 19 grams of acrylic acid (0.264 mole) is added into the reactor at 0.8 gram/min. After the acrylic acid addition is complete, the polymerization continues at 40° C. for four hours. The product is discharged after cooled to 25° C. It has a Mn 11810, and Mw/Mn: 1.31. The slump is tested according to the procedure of Example 1. It has slump: slump 96, flow 149 at 0.10% dosage.

COMPARATIVE EXAMPLE 4

Preparation of Comb-branched Copolymer by Batch Process

Polyether macromonomer as described in Example 1 (150 g, 0 075 mole), acrylic acid (21.6 g, 0.30 mole), mercaptopropionic acid (0 8 g), and DI water (163 g) are charged to the reactor. The reactor contents are purged with $N_2$ for 20 minutes at room temperature and then the reactor is sealed with $N_2$ (3 psi). The reactor contents are heated to 40° C., and 65 grams of ammonium persulfate aqueous solution (25 wt %) is injected into the reactor. The polymerization is carried out at 40° C. for four hours. The product is discharged after cooled to 25° C. It has a Mn: 15850, and Mw/Mn: 1.30. The slump is tested according to the procedure of Example 1. It has slump: slump 114, flow 199 at 0.08% dosage.

TABLE 1

Comparison of Continuous Process with Batch and Semi-batch Processes

| Example | Process | Molar Ratio of Acrylic acid/Macromonomer | Dose in Cement | Slump, mm | Flow, mm |
|---------|-----------|---|------|-----|-----|
| 1 | Continuous | 6 | 0.1 | 124 | 202 |
| 2 | Two-stage | 4 | 0.08 | 128 | 236 |
| C3* | Semi-batch | 6 | 0.1 | 96 | 149 |
| C4* | Batch | 4 | 0.08 | 114 | 199 |

*Comparative examples

Table 1 summarizes the different performance of the comb-branched copolymers made by the continuous process of the invention versus the semi-batch and batch processes (Comparative Examples 3 and 4). Comparing examples that use the same copolymer composition and same dose in cement (i.e., 1 versus C3 and 2 versus C4), it is clear that the comb-branched copolymers made by the continuous process have significantly higher slump and flow than those made by either the semi-batch or batch process.

We claim:

1. A continuous process which comprises:
   (a) continuously forming and feeding into a reactor two separate streams: (i) a monomer stream consisting essentially of an acrylic monomer, a polyether macromonomer selected from the group consisting of poly (propylene glycol) acrylate, poly(propylene glycol) methacrylate, poly(ethylene glycol) acrylate, poly (ethylene glycol) methacrylate, acrylates and methacrylates of an oxyethylene and oxypropylene block and random copolymer, and mixtures thereof, a solvent, and a chain transfer agent; and (ii) an initiator stream consisting essentially of a free radical initiator and a solvent;
   (b) continuously polymerizing the streams in a the reactor at a temperature within the range of about 40° C. to about 60° C.; and
   (c) continuously withdrawing a polymer stream from the reactor.

2. The process of claim 1 wherein the acrylic monomer is selected from the group consisting of acrylic acid, methacrylic acid, sodium acrylate, sodium methacrylate, ammonium acrylate, ammonium methacrylate, potassium acrylate, potassium methacrylate, and mixtures thereof.

* * * * *